(12) United States Patent
Pinto

(10) Patent No.: US 8,142,180 B2
(45) Date of Patent: Mar. 27, 2012

(54) FORMING WIRE

(75) Inventor: Robert Pinto, Hainesville, IL (US)

(73) Assignee: Poly-Clip System Corp., Mundelein, IL (US)

( * ) Notice: Subject to any disclaimer, the term of this patent is extended or adjusted under 35 U.S.C. 154(b) by 303 days.

(21) Appl. No.: 12/645,206

(22) Filed: Dec. 22, 2009

(65) Prior Publication Data
US 2010/0159052 A1 Jun. 24, 2010

Related U.S. Application Data

(60) Provisional application No. 61/203,699, filed on Dec. 23, 2008.

(51) Int. Cl.
*B28B 21/00* (2006.01)
(52) U.S. Cl. ...................................... 425/391; 425/112
(58) Field of Classification Search .................. 425/391, 425/436 R, 469, 470, 112; 53/563
See application file for complete search history.

(56) References Cited

U.S. PATENT DOCUMENTS

| | | | | |
|---|---|---|---|---|
| 3,127,819 A | * | 4/1964 | Woolsey | 493/468 |
| 4,671,047 A | * | 6/1987 | Mugnai | 53/550 |
| 5,042,234 A | * | 8/1991 | Evans et al. | 53/523 |
| 5,147,671 A | * | 9/1992 | Winkler | 426/140 |

* cited by examiner

*Primary Examiner* — Maria Veronica Ewald
(74) *Attorney, Agent, or Firm* — Clark Hill PLC

(57) ABSTRACT

An improved forming wire is described. A forming wire in a first embodiment comprises a base comprising a structure with a bore therethrough, a first support arm and a second support arm, each said arm projecting normally from said base, each said arm having a proximal tip connected to said base and a distal tip remote from said base, a bending loop having an arcuate shape and extending from the distal tip of the first support arm to the distal tip of the second support arm, an inner arm having a helical shape and extending from the distal tip of the first support arm to the base; and an outer arm having a helical shape and extending from the distal tip of the second support arm to a point above the base, thereby defining a space between the base and the outer arm. In other embodiments, the forming wire has a single support arm. In some embodiments, the forming wire is made of poly-tetrafluoroethylene tubing over stainless steel rods.

19 Claims, 3 Drawing Sheets

FORMING WIRE

CROSS-REFERENCE TO RELATED APPLICATIONS

This application claims priority from U.S. Provisional Patent Application No. 61/203,699, filed Dec. 23, 2008, the disclosure of which is incorporated herein.

BACKGROUND OF THE INVENTION

This invention relates to the field of preparing products in tubular casings and enclosing the products in netting. One method generally used in the food industry is to pump food products, such as pasty sausage meat, whole muscle meats, or otherwise, through a product horn. The food products are forced into a tube formed continuously from flat sheets of film. A similar process is used for non-food products, such as caulking material. The flat sheet of film is formed either from roll stock or from fan-folded film.

The film is brought over a forming wire or a forming shoulder to roll the flat sheet into a tube. A pasty mixture is pumped into the tube, which expands as it is filled against a coaxial netting. This process is described in, for examples, U.S. Pat. No. 7,441,386, Apparatus for Forming Tubes in Nets, U.S. Pat. No. 7,063,610, Apparatus and Method to Net Food Products in Shirred Tubular Casing, and U.S. Pat. No. 4,958,477, Apparatus for the Production of Meat Products, the disclosures of all three of which are incorporated herein.

Various types of film are used to create the tube. Common materials used in food products include plastic, collagen, paper, cellulose, and other vegetable products. End users choose the film material based on the end use of the materials, cost of the film, ease of use of the film, custom and practice, and, sometimes, religious considerations. For example, collagen does not have to be removed from a food end product, as it is incorporated into the food during processing. Collagen, however, is made usually from beef hides. Cellulose is relatively inexpensive, but must be removed from a food end product.

Regardless of which material is chosen, the film must be brought over a forming wire and formed into a tube. This process produces friction between the forming wire and the film and causes drag on the film. It is desirable to reduce both friction and drag. One way that has been attempted is to use a plastic roller or plastic beads on the forming wire. This method has not been particularly successful. Another alternative has been to coat the forming wire with a fluoropolymer such as the one sold under the brand name Teflon® by E. I. du Pont de Nemours and Company or its affiliates. The constant motion of film over coated forming wire, however, causes the coating to rub off. Consequently, the forming wire must be removed periodically and sent out for re-coating, which causes downtime in the production process and an added expense.

BRIEF SUMMARY OF THE INVENTION

An improved forming wire in a first embodiment comprises a base comprising a structure with a bore therethrough, a first support arm and a second support arm, each said arm projecting normally from said base, each said arm having a proximal tip connected to said base and a distal tip remote from said base, a bending loop having an arcuate shape and extending from the distal tip of the first support arm to the distal tip of the second support arm, an inner arm having a helical shape and extending from the distal tip of the first support arm to the base; and an outer arm having a helical shape and extending from the distal tip of the second support arm to a point above the base, thereby defining a space between the base and the outer arm. In other embodiments, the forming wire has a single support arm. In some embodiments, ears extend from the support arm or arms to the base. In some embodiments, the forming wire is made of polytetrafluoroethylene tubing over stainless steel rods.

DETAILED DESCRIPTION OF THE EMBODIMENTS OF THE INVENTION

The organization and manner of the preferred embodiments of the invention, together with further objects and advantages thereof, may best be understood by reference to the following description, taken in connection with the drawings.

Figure 1:
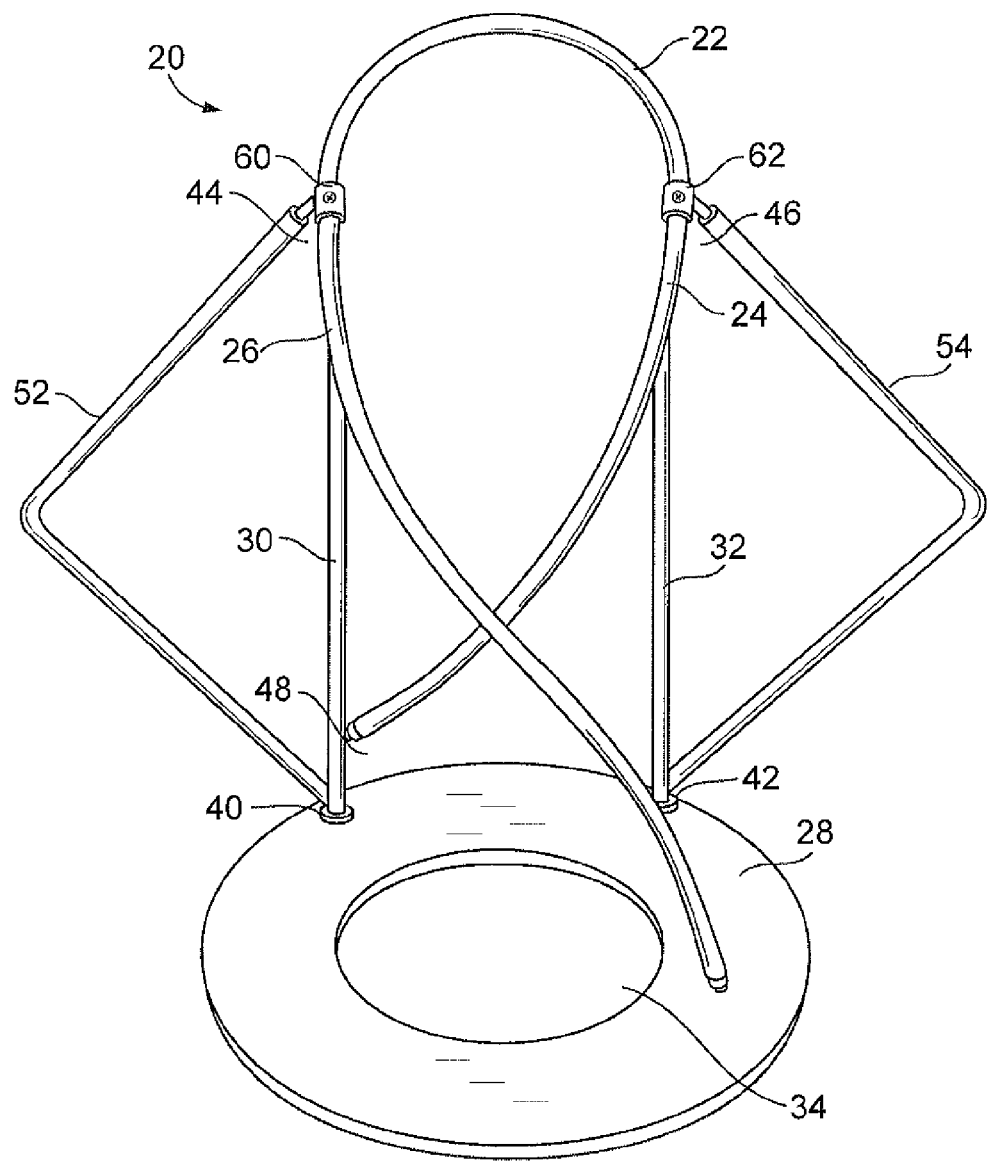
FIG. 1 is a perspective view of the preferred embodiment of the present invention.

The forming wire 20 of the preferred embodiment of the present invention is shown in perspective view in FIG. 1. Forming wire 20 in this embodiment has a bending loop 22, an inner arm 24, and an outer arm 26. Forming wire is attached to a base 28, to first support arm 30, and to second support arm 32.

Figure 2:
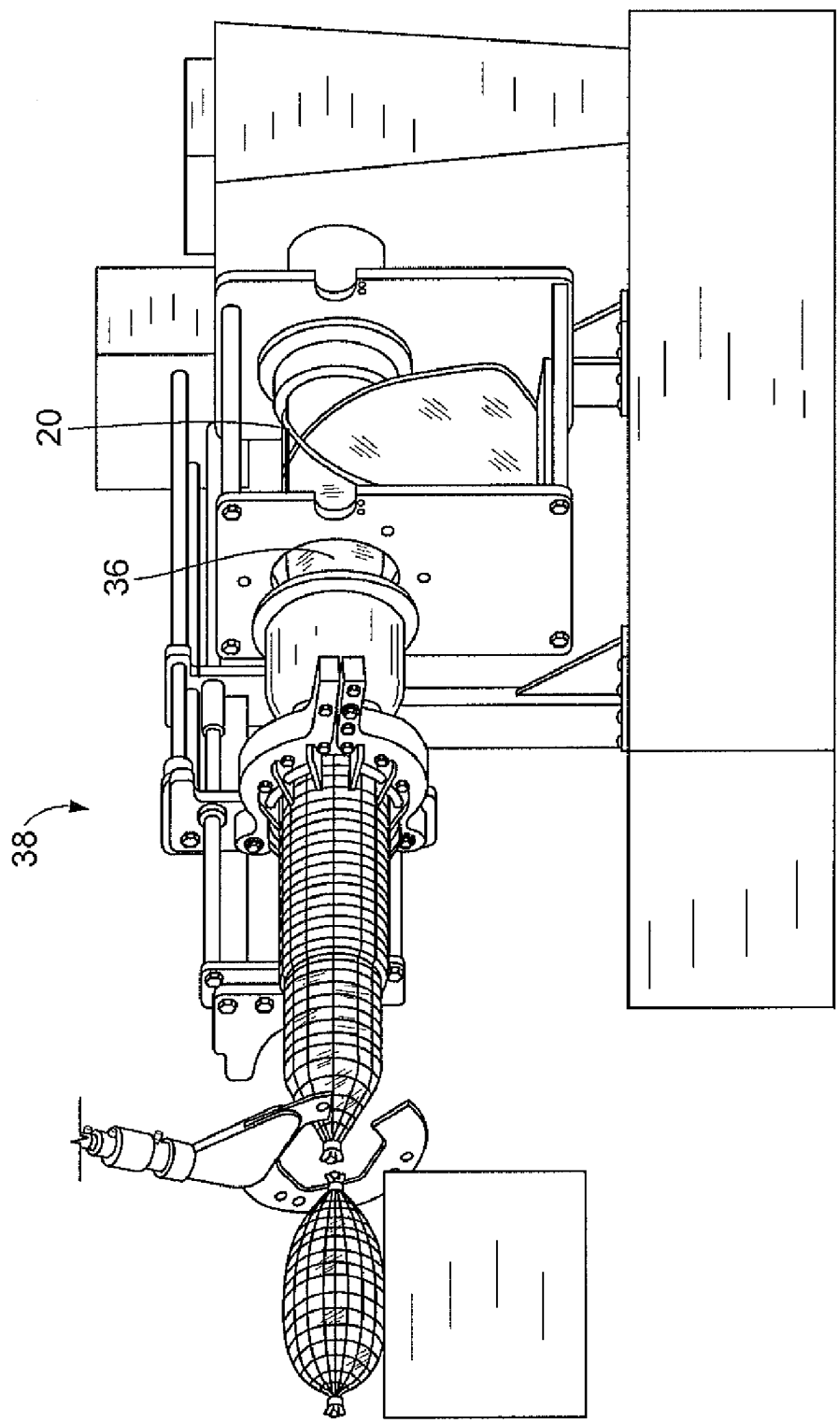
FIG. 2 is a side view of a clipper/stuffer using the improved forming wire of claim 1.

Base 28 is a flat structure with a circular bore 34 therethrough, through which a product horn 36 of a stuffer/clipper 38 will be inserted, as shown in side view in FIG. 2. Base 28 is configured to be attached to stutter/clipper 38 by bolts, snaps, or other attachment devices.

First support arm 30 and second support arm 32 project normally from base 28. Preferably, first support arm 30 and second support arm 32 are welded to base 28 at their proximal tips 40, 42, but can alternatively attach to base 28 by threading or by threads and nuts.

Bending loop 22 is an arcuate-shaped member spanning from the distal tip 44 of first support arm 30 to the distal tip 46 of second support arm 32. Outer arm 26 is a helical-shaped member spanning from distal tip 44 to base 28. Outer arm 26 can be permanently connected to base 28, such as by welding, or can be removably connected, such as by threading or by threads and nuts. Inner arm 24 is a helical member spanning from distal tip 46 to just above base 28, leaving a space 48 between base 28 and the proximal tip 50 of inner arm 26.

In some aspects, a pair of ears 52, 54 is provided on forming wire 20. First ear 52 is a V-shaped member connected to first support arm 30 at its proximal tip 40 and its distal tip 44. Second ear 54 is a V-shaped member connected to second support arm 32 at its proximal tip 42 and its distal tip 46. Ears 52, 54 can be permanently attached to support arms 30, 32, such as by welding, or can be removably connected.

Distal tip 44, bending loop 22, and outer arm 26 meet at connection point 60. Distal tip 46, bending loop 22, and inner arm 24 meet at connection point 62. Connection points 60, 62 are preferably removable connections. For example, each distal tip 44, 46 can have a U-shaped member into which bending loop 22 and one of support arms 30, 32 can snap and be held by interference fit. Other possible means of connecting at connection points 60, 62 are by pings, threads, bayonet-type connector, or other similar structure.

Figure 3:
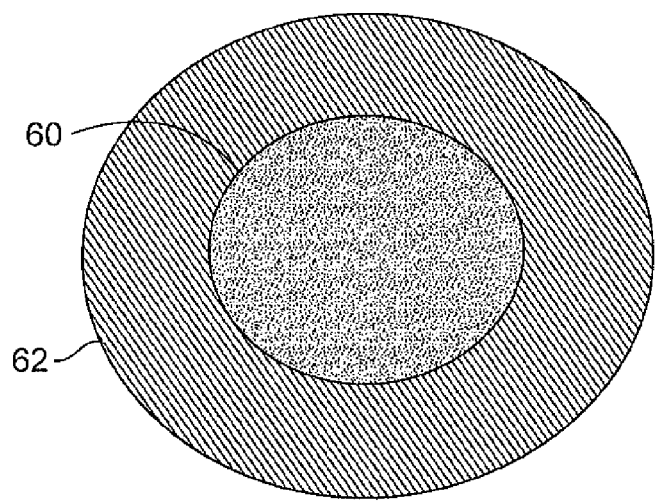
FIG. 3 is a cross-sectional view of a portion of the forming wire of claim 1.

Bending loop 22, inner arm 24, and outer arm 26 are preferably each made of the same materials, as shown in cross-section in FIG. 3. An inner portion 60 is stainless steel wire. An outer portion 62 is polytetrafluoroethylene ["PTFE"] tubing. PTFE tubing is available from, for example, McMaster-Carr Supply Co., 600 N County Line Rd., Elmhurst, Ill. PTFE tubing provides at least as much reduction in sliding resistance as does Teflon® coating as used in the prior art, but will last much longer.

In the preferred embodiment, inner portion 60 is made of 5/16-inch stainless steel wire and outer portion 62 is made of 3/8-inch PTFE tubing. In another aspect, inner portion 60 is made of 3/8-inch wire and outer portion 62 is made of 1/2-inch PTFE tubing. Other sizes of stainless wire and PTFE tubing can be used depending on the application.

PTFE tubing also does not absorb water so it is USDA-compliant, an important consideration in food-manufacturing operations. Since a forming wire does not actually touch a food product, the forming wire need not technically be USDA-compliant, but purchasers of food-processing equipment typically are more comfortable if all components of the equipment are USDA-compliant, not just those components that are technically required to meet food-processing regulations.

In the event of damage to or excessive wear of outer portion 62, forming wire 20 can be disassembled, the PTFE tubing can be removed, and new PTFE tubing can slide onto inner portion 62.

In use, film 64, which can be in flat-sheet, fan-fold format or rolled on a tube, is placed through bending loop 22 and between inner arm 24 and outer arm 26 to form film 64 into a tube around product horn 36.

Figure 4:
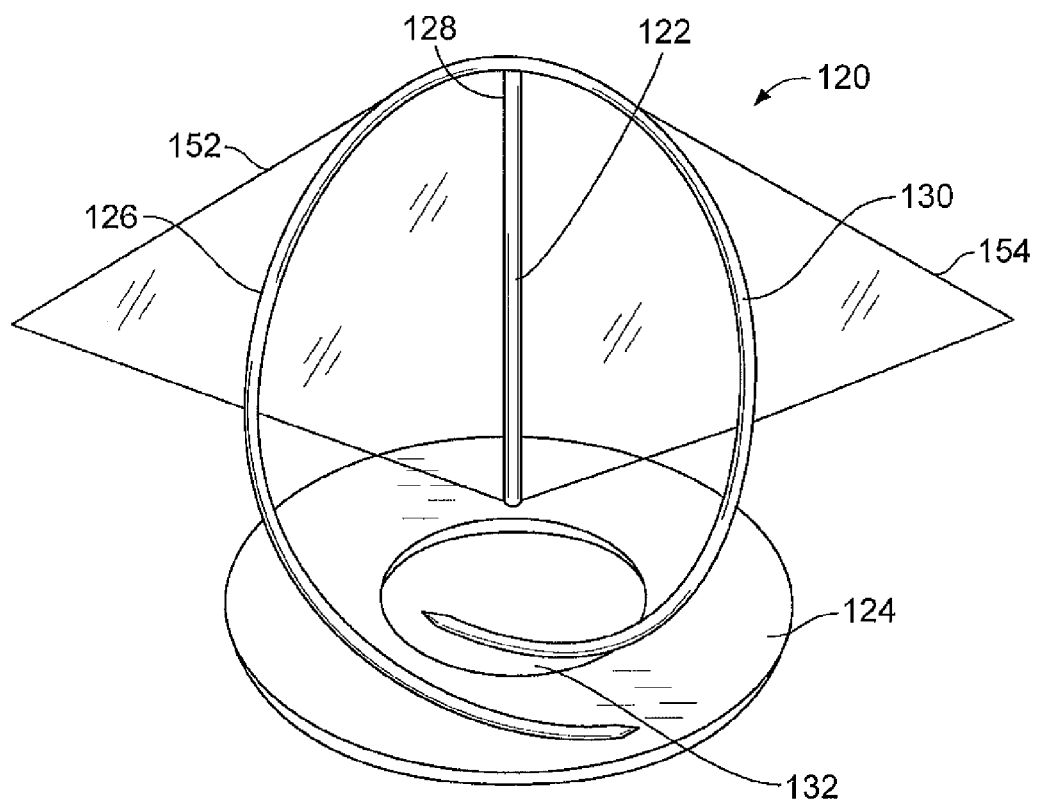
FIG. 4 is a perspective view of another aspect of the present invention.

In another aspect, forming wire 120 has a single support arm 122, as shown in FIG. 4. Support arm 122 connects to base 124 as described above. Outer arm 126 is a helical member extending from the distal tip 128 of support arm 122 to base 124. Inner arm 130 is a helical member extending from distal tip 128 to just above base 124, leaving a space 132 between inner arm 130 and base 124. Inner arm 130 and outer arm 126 are constructed of stainless steel rod and PTFE, tubing as described above. If the user desires, ears 152, 154, described above, can span from distal tip 128 to proximal tip 134 of support arm 122.

While preferred embodiments of the present invention are shown and described, it is envisioned that those skilled in the art may devise modifications of the present invention without departing from the spirit and scope of the appended claims.

I claim:

1. A forming wire, comprising:
   a base comprising a flat structure having a first side and a second side and a bore therethrough;
   a first support arm and a second support arm, each said arm projecting normally from said first side of said base, each said arm having a proximal tip connected to said first side of said base and a distal tip remote from said base;
   a bending loop having an arcuate shape and extending from the distal tip of the first support arm to the distal tip of the second support arm;
   an outer arm having a helical shape and extending from the distal tip of the first support arm to the base; and
   an inner arm having a helical shape and extending from the distal tip of the second support arm to a point above the base, thereby defining a space between the base and the inner arm.

2. The forming wire of claim 1, further comprising a first ear and a second ear, the first ear having a V shape and connected to the distal tip and the proximal tip of the first support arm, the second ear having a V shape and connected to the distal tip and the proximal tip of the second support arm.

3. The forming wire of claim 2, wherein the ears are removably connected to the support arms.

4. The forming wire of claim 1, wherein the bending loop is removably connected to the distal tip of the first support arm and to the distal tip of the second support arm.

5. The forming wire of claim 4, wherein the inner arm is removably connected to the distal tip of the first support arm and to the base.

6. The forming wire of claim 1, wherein the inner arm is removably connected to the distal tip of the first support arm and to the base.

7. The forming wire of claim 6, wherein the outer arm is removably connected to the distal tip of the second support arm.

8. The forming wire of claim 5, wherein the outer arm is removably connected to the distal tip of the second support arm.

9. The forming wire of claim 1, wherein the outer arm is removably connected to the distal tip of the second support arm.

10. An clipper/stuffer comprising the forming wire of claim 1.

11. The forming wire of claim 1, wherein each of the bending loop, inner arm, and outer arm comprise an inner portion comprising stainless steel wire and an outer portion comprising polytetrafluoroethylene tubing.

12. A forming wire, comprising:
    a base comprising a flat structure having a first side and a second side and a bore therethrough;
    a support arm projecting normally from said first side of said base, the arm having a proximal tip connected to said first side of said base and a distal tip remote from said base;
    an outer arm having a helical shape and extending from the distal tip of the support arm to said first side of said base;
    an inner arm having a helical shape and extending from the distal tip of the support arm to a point above said first side of said base, thereby defining a space between said first side of said base and said inner arm; and
    a first ear and a second ear, the first ear having a V shape and connected to the distal tip and the proximal tip of the support arm, the second ear having a V shape and connected to the distal tip and the proximal tip of the support arm;
    wherein the inner arm and outer arm each comprise an inner portion comprising stainless steel wire and an outer portion comprising polytetrafluoroethylene tubing.

13. The forming wire of claim 12, wherein the ears are removably connected to the support arms.

14. The forming wire of claim 12, wherein the inner arm is removably connected to the distal tip of the support arm and to the base.

15. The forming wire of claim 14, wherein the outer arm is removably connected to the distal tip of the second support arm.

16. The forming wire of claim 12, wherein the outer arm is removably connected to the distal tip of the second support arm.

17. A clipper/stuffer comprising the forming wire of claim 12.

18. A clipper/stuffer comprising the forming wire of claim 11.

19. A clipper/stuffer comprising the forming wire of claim 12.

* * * * *

UNITED STATES PATENT AND TRADEMARK OFFICE
CERTIFICATE OF CORRECTION

PATENT NO. : 8,142,180 B2
APPLICATION NO. : 12/645206
DATED : March 27, 2012
INVENTOR(S) : Robert Pinto Page 1 of 1

It is certified that error appears in the above-identified patent and that said Letters Patent is hereby corrected as shown below:

Column 2, Line 39 "stutter/clipper 38" should be -- stuffer/clipper 38 --

Signed and Sealed this
Fifth Day of February, 2013

Teresa Stanek Rea
*Acting Director of the United States Patent and Trademark Office*